United States Patent Office 3,432,490
Patented Mar. 11, 1969

3,432,490
2-(β-HEXAMETHYLENE IMINO ETHYL) CYCLO-
HEXANONE - 2 - CARBOXYLIC ACID BENZYL
ESTER AND SALTS THEREOF
Albert Frank, Kundl, Tyrol, Alfred Kraushaar, Kufstein, Tyrol, Hans Margreiter, Radfeld, Tyrol, and Roland Schunk, Kundl, Tyrol, Austria, assignors to Biochemie G.m.b.H., Kundl, Tyrol, Austria, a corporation of Austria
No Drawing. Filed Nov. 5, 1963, Ser. No. 321,423
Claims priority, application Austria, Nov. 8, 1962,
A 8,802/62
U.S. Cl. 260—239         6 Claims
Int. Cl. C07d 41/04; A61k 27/00

The present invention relates to a valuable new, basically substituted cyclohexanone-2-carboxylic acid ester capable of suppressing coughing, and more particularly, to compositions containing such a basically substituted cyclohexanone-2-carboxylic acid ester useful as pectoral and antitussive agent, and to a process of therapeutically using such compositions.

It is one object of the present invention to provide valuable pectoral compositions, which have proved of value as antitussive and pectoral agents.

Another object of the present invention is to provide a process of using such compositions in therapy as antitussive and pectoral agents.

A further object of the present invention is to provide a new basically substituted cyclohexanone-2-carboxylic acid ester of surprisingly high antitussive activity.

Still another object of the present invention is to provide a simple and effective proces of producing such a a new basically substituted cyclohexanone-2-carboxylic ester.

Other objects of the present invention and advantageous features thereof will become apparent as the description proceeds.

According to the present invention it has been found that 2-(β-hexamethylene imino ethyl) cyclohexanone-2-carboxylic acid benzyl ester and its optically active isomers as well as its acid addition salts possess a pronounced antitussive and pectoral activity.

Heretofore, such an effect has never been observed with basically substituted cyclohexanone-2-carboxylic acid esters. The antitussive activity of the new compound is considerably higher than that of the best known antitussive compounds as shown by pharmacological and clinical tests.

The new 2-(β-hexamethylene imino ethyl) cyclohexanone-2-carboxylic acid benzyl ester is prepared, for instance, by condensing cyclohexanone-2-carboxylic acid benzyl ester either in the form of its alkali metal compounds, preferably of its sodium compound, or in the presence of a condensing agent, preferably of sodium oxide, with a β-hexamethylene imino ethyl halogenide, preferably with β-hexamethylene imino ethyl chloride. The resulting 2-(β-hexamethylene imino ethyl) cyclohexanone-2-carboxylic acid benzyl ester may be resolved into its optically active isomers and may be converted into its acid addition salts or the acid addition salts of its optically active isomers.

The condensation is preferably carried out in the presence of a solvent. Aromatic hydrocarbons such as benzene and its homologues have proved especially suitable for this purpose.

The following example serves to illustrate the present invention without, however, limiting the same thereto.

Example 1

0.2 mole (46.4 g.) of cyclohexanone-2-carboxylic acid benzyl ester (boiling point: 173–174° C. 3 mm. Hg) are added drop by drop to a boiling suspension of 0.1 mole of sodium oxide in 500 ml. of benzene, while stirring, at such a rate that the water formed due to salt formation is continuously removed by azeotropic distillation with the boiling benzene. The evaporated benzene is replaced from time to time by the addition of fresh benzene. As soon as the reaction water is removed 0.2 mole (32.4 g.) of β-hexamethylene imino ethyl chloride (boiling point: 84–85° C./10 mm. Hg) are added drop by drop thereto within 30 minutes. Half of the benzene is then distilled off and the remaining reaction mixture is boiled under reflux for 8 hours. The resulting reaction product is isolated from the reaction mixture by extraction with aqueous hydrochloric acid. The benzene layer is separated and the aqueous layer with the precipitated oily hydrochloride of the base is heated to a temperature of 70° C. at a pH of 2.0 for 30 minutes, while stirring. After cooling, neutral decomposition products are extracted by means of benzene. Dilute aqueous sodium hydroxide solution is added to the aqueous solution and the resulting base is extracted by means of benzene. The benzene solution is washed with water, the benzene is distilled off, and the residue is heated in a vacuum at 180° C. and a pressure of 1 mm. Hg in order to remove readily volatile basic compounds. The remaining basic ester is dissolved in acetone. The hydrochloride of the 2-(β-hexamethylene imino ethyl) cyclohexanone-2-carboxylic acid benzyl ester is precipitated from the acetone solution by introducing gaseous hydrochloric acid thereinto. The yield of 2-(β-hexamethylene imino ethyl) cyclohexanone - 2 - carboxylic acid benzyl ester hydrochloride is 51.4 g. corresponding to 65% of the theoretical yield. Colorless crystals are obtained which are soluble in water and alcohol; melting point: 136–137° C.

Analysis.—$C_{22}H_{32}O_3NCl$: Calculated: C, 67.04%; H, 8.18%. Found: C, 67.16%; H, 8.47%.

In place of hydrochloric acid, other pharmaceutically acceptable, substantially non-toxic acids may be used to produce acid addition salts of the new base, for instance, sulfuric acid, phosphoric acid, nitric acid, sulfamic acid, or organic acids such as oxalic acid, tartaric acid, malic acid, phthalic acid, nicotinic acid, benzoic acid and others. Hydrobromic acid and maleic acid, have proved to form especially useful acid addition salts.

The 2-(β-hexamethylene imino ethyl) cyclohexanone-2-carboxylic acid benzyl ester hydrobromide is obtained in the form of colorless needles of the melting point 140–143° C. on recrystallization from ethanol.

The 2-(β-hexamethylene imino ethyl) cyclohexanone-2-carboxylic acid benzyl ester maleate is obtained in the form of colorless crystals of the melting point 101–105° C. (with decomposition).

The results of pharmacological tests as carried out with the new 2-(β-hexamethylene imino ethyl) cyclohexanone-2-carboxylic acid benzyl ester are given in the following Table I, in which the antitussive effect of said compound is compared with the antitussive effect of known compounds.

The tests were carried out with non-narcotized guinea pigs in a glass chamber. Coughing was experimentally induced by means of a 3.8% ammonia aerosol. The number of coughs was counted automatically by means of an electric counting device. The time of exposure of the animals to the cough inducing agent was three minutes in each test. Only such animals were used which coughed, in a preliminary test, between, at least, 10 times, and, at the most, 50 times. Each animal was subjected to a control test before using it in the actual test. Four hours after the control test the compound to be tested was administered subcutaneously to each animal. One hour after administration of the compound to be tested the animals were again exposed to the ammonia aerosol and the difference in the number of coughs induced by the first exposure and by the second exposure was determined. The inhibition of the number of coughs in percent was taken as a measure of the activity of the respective compound. Each tested compound was administered in a dose of 0.75 mg./kg. Such a dose of codeine caused a cough inhibition of 33.5%. Highly effective other compounds were also tested in a dose of 0.1 mg./kg.

TABLE

| Compound | Antitussive effect | |
|---|---|---|
| | Dose in mg./kg. | Inhibition in percent |
| According to the present invention: 2-(β-hexamethylene imino ethyl) cyclohexanone-2-carboxylic acid benzyl ester hydrochloride. | 0.75<br>0.10 | 83.2<br>22.8 |
| Known compounds: | | |
| Codeine | 0.75 | 33.5 |
| Narcotine | 0.75 | 36.9 |
| Codeine nicotinic acid ester | 0.75 | 46.2 |
| 1,1-diphenyl-1-dimethylamino ethyl butanone-(2)-hydrochloride. | 0.75<br>0.10 | 56.2<br>15.8 |
| 1-o-chloro phenyl-1-phenyl-3-dimethyl-amino propanol-(1)-hydrochloride. | 0.75<br>0.10 | 48.8<br>5.1 |
| (+)3-methoxy-N-methyl morphinane hydrobromide | 0.75 | 38.9 |
| The pyrido benzo thiazine compound of the formula | 0.75 | 31.0 |

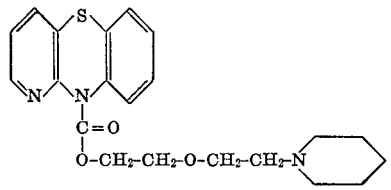

| 1-p-chloro phenyl-2,3-dimethyl-4-dimethylamino butanol-(2)-hydrochloride | 0.75 | 27.9 |
|---|---|---|
| α-(isopropyl)-α-(β-dimethylamino propyl) phenyl acetonitrile | 0.75 | 33.0 |
| 1-p-chloro benzhydryl-4-methyl piperazine hydrochloride. | 0.75<br>0.10 | 29.0<br>13.0 |

The tests prove clearly that the antitussive effect of the new 2-(β-hexamethylene imino ethyl) cyclohexanone-2-carboxylic acid benzyl ester is far superior to that of the known antitussive compounds. Even on administration of such a small dose as 0.1 mg./kg. an antitussive effect of more than 20% is achieved. It is evident from the above given table that the new compound is much more effective than any other antitussive compound which is known and used in therapy for this purpose.

The toxicity of the new hydrochloride of 2-(β-hexamethylene imino ethyl) cyclohexanone-2-carboxylic acid benzyl ester according to the present invention is remarkably low. The LD$_{50}$ in mice amounts to 90 mg./kg. on subcutaneous administration, to 108 mg./kg. on oral administration, and to 12 mg./kg. on intravenous administration.

The pharmacological tests and administration to patients clearly prove that the new compound is a highly effective antitussive agent. It is about three times as effective as codeine and is substantially more effective than other commercially available drugs used in therapy. Its mechanism of activity is not based on a central inhibition of the cough center as is evidenced by the absence of any analgesic activity. It is assumed that its point of attack is located in the periphery, i.e. an endoanesthesia of the lung stretch receptors is achieved which, together with a papaverine-like spasmolytic effect, produces the clinical effect.

As has been found, the new compound does not cause obstipation.

When clinically administered in a dose of three times daily, i.e. in a dose of 15 mg. to 30 mg. of 2-(β-hexamethylene imino ethyl) cyclohexanone-2-carboxylic acid benzyl ester per day, no undesirable side-effects were observed. The compound was well tolerated.

Chronic toxicity tests were carried out over a prolonged period of time with the new compound, which was administered orally in a dose of 10 mgs./kg. to rats for more than 22 weeks. No differences in weight, behavior, and appearance of the tested animals over control animals were observed. No deformities were found in the F$_1$-generation of the treated animals. Said animals of the F$_1$-generation were treated, after weaning, first with the same dose for seven weeks and thereafter with ten times said dose for seven more weeks. No differences over the control animals were found after said period of 14 weeks. Histological examination of the most important organs of animals treated with an extremely high dose for three weeks also did not show toxic effects.

Testing of the new antitussive compound for its local tolerability showed only insignificant irritation on parenteral application and no irritation of the gastric mucosa on oral application of high doses.

On plotting the time-activity curve for the new antitussive compound by means of the aerosol test the new compound shows a pronounced superiority over the standard antitussive compound codeine not only with respect to its effectiveness but also with respect to the persistency of its antitussive effect.

The new antitussive 2-(β-hexamethylene imino ethyl) cyclohexanone-2-carboxylic acid benzyl ester exhibits an increased pilocarpine secretion on testing for its effects on secretory processes.

The antitussive compound according to the present invention or its acid addition salts may be administered orally in the solid state in the form of tablets, dragées, capsules, or the like shaped preparations, or in the form of solutions, emulsions, suspensions, and the like. Rectal administration in the form of suppositories is also possible as well as parenteral administration, for instance, of aqueous solutions of the acid addition salts by subcutaneous or intravenous injection.

When preparing tablets, dragées, pills, and the like solid shaped preparations to be used in human therapy, commonly used diluting agents, binders, lubricants, and other tableting adjuvants are employed, such as sugar, lacetose, talc, starch, bolus alba; as binders, pectin, gelatin, gum arabic, methyl cellulose, yeast extract, agar, tragacanth; and as lubricants stearic acid, magnesium stearate, and others.

The content of the active compound in such preparations may vary. It is, of course, necessary that the active compound be present in such an amount that a suitable dosage will be ensured. Ordinarily dragées should not contain less than 3.0 mg. per dragée, preferably 5.0 mg., i.e. between about 5% and about 10% of the active compound calculated for 2-(β-hexamethylene imino ethyl) cyclohexanone-2-carboxylic acid benzyl ester hydrochloride.

The following examples of compositions containing 2-(β-hexamethylene imino ethyl) cyclohexanone-2-carboxylic acid benzyl ester hydrochloride and its optical isomers or acid addition salts as they may be used in therapy, serve to further illustrate the present invention without, however, limiting the same thereto.

Example 2

5 mg. of 2-(β-hexamethylene imino ethyl) cyclohexanone-2-carboxylic acid benzyl ester hydrochloride and 48.0 mg. of starch are intimately mixed. The resulting mixture is pressed into tablets which are sugar-coated to dragées, each weighing about 100 mg. Dosage: One or two dragées three times daily.

Example 3

50.00 mg. of 2-(β-hexamethylene imino ethyl) cyclohexanone-2-carboxylic acid benzyl ester hydrochloride are dissolved in distilled water. Flavoring compounds are added thereto and the solution is made up to 100 cc. Dosage: One to two teaspoons full of the solution three times daily.

Example 4

5 g. of 2-(β-hexamethylene imino ethyl) cyclohexanone-2-carboxylic acid benzyl ester hydrochloride are dissolved in 460 cc. of water. 20 drops of the so prepared solution correspond to about 0.46 cc. and contain 5 mg. of the antitussive compound. Dosage: 20 drops three times daily.

Example 5

5 mg. of 2-(β-hexamethylene imino ethyl) cyclohexanone-2-carboxylic acid benzyl ester hydrochloride are intimately incorporated into 1 g. of a conventional suppository vehicle, for instance, theobroma oil. After homogenization, the mixture is poured into suppository molds.

Dosage: One suppository in the evening before retiring.

Other compositions may be prepared in a manner well known to the art.

Of course, many changes and variations in the reaction components, the solvents used, the reaction conditions, temperature, duration, concentration of the reaction components, in the methods of working up the reaction mixture and of isolating and purifying the reaction products, in the preparation of pharmaceutical compositions containing the same, and the like, may be made by those skilled in the art in accordance with the principles set forth herein and in the claims annexed hereto.

We claim:
1. 2-(β-hexamethylene imino ethyl) cyclohexanone-2-carboxylic acid benzyl ester hydrochloride.
2. 2-(β-hexamethylene imino ethyl) cyclohexanone-2-carboxylic acid benzyl ester hydrobromide.
3. 2-(β-hexamethylene imino ethyl) cyclohexanone-2-carboxylic acid benzyl ester maleate.
4. The pharmaceutically acceptable, substantially non-toxic acid addition salts of 2-(β-hexamethylene imino ethyl) cyclohexanone-2-carboxylic acid benzyl ester.
5. 2-(β-hexamethylene imino ethyl) cyclohexanone-2-carboxylic acid benzyl ester.
6. A compound selected from the group consisting of 2-(β-hexamethylene imino ethyl) cyclohexanone-2-carboxylic acid benzyl ester and its acid addition salts with pharmaceutically acceptable, substantially non-toxic acids.

References Cited

FOREIGN PATENTS 176,844  11/1953  Austria.

OTHER REFERENCES

Burger: Medicinal Chemistry (New York, 1960), p. 672–673.

ALTON D. ROLLINS, *Primary Examiner.*

U.S. Cl. X.R.

260—295.5; 424—244, 305